United States Patent

Summit

(10) Patent No.: US 9,302,892 B1
(45) Date of Patent: Apr. 5, 2016

(54) TOILET LIFTING DEVICE

(71) Applicant: Ervin D. Summit, Russellville, AK (US)

(72) Inventor: Ervin D. Summit, Russellville, AK (US)

(*) Notice: Subject to any disclaimer, the term of this patent is extended or adjusted under 35 U.S.C. 154(b) by 181 days.

(21) Appl. No.: 14/146,799

(22) Filed: Jan. 3, 2014

(51) Int. Cl.
*B62B 3/00* (2006.01)
*B66F 9/18* (2006.01)
*B62B 3/06* (2006.01)
*B66F 3/36* (2006.01)

(52) U.S. Cl.
CPC ............... *B66F 9/18* (2013.01); *B62B 3/0618* (2013.01); *B66F 3/36* (2013.01)

(58) Field of Classification Search
CPC .......... B62B 3/06; B62B 3/0618; B62B 3/10; B62B 2202/80
See application file for complete search history.

(56) References Cited

U.S. PATENT DOCUMENTS

| | | | | |
|---|---|---|---|---|
| 3,391,905 A * | 7/1968 | Burns | .................... | B62B 3/0625 212/901 |
| 4,722,511 A * | 2/1988 | Chitwood | ............. | B62B 3/0625 254/134 |
| 5,203,065 A * | 4/1993 | Peters | ...................... | B25H 1/00 254/2 R |
| 5,373,593 A * | 12/1994 | Decky | ....................... | B62B 3/10 254/7 R |
| 5,556,076 A | 9/1996 | Jacquay | | |
| 5,897,101 A * | 4/1999 | Snyder | .................... | B66C 23/48 254/8 B |
| 6,135,466 A * | 10/2000 | Irwin | ........................ | B62B 1/12 280/47.19 |
| 6,752,379 B1 | 6/2004 | Wall | | |
| 7,058,996 B1 | 6/2006 | Merrill | | |
| 7,823,862 B2 | 11/2010 | Wakil | | |
| 7,841,028 B1 | 11/2010 | Rojas | | |
| 2007/0256238 A1* | 11/2007 | Wakil | .................... | B62B 3/0643 4/661 |
| 2007/0266492 A1* | 11/2007 | Junca | .................... | B62B 3/0643 4/661 |
| 2008/0109957 A1* | 5/2008 | Blancke | .................... | B62B 3/10 4/661 |
| 2009/0199384 A1* | 8/2009 | Head | ........................ | B62B 3/00 29/281.4 |
| 2014/0339483 A1* | 11/2014 | Herb | ........................ | B62B 3/10 254/2 C |

* cited by examiner

*Primary Examiner* — Lee D Wilson
*Assistant Examiner* — Tyrone V Hall, Jr.

(57) ABSTRACT

A toilet lifting device facilitates lifting of a toilet when replacing a toilet fixture. The device includes a base and a pair of legs extending from the base. The legs are coplanar with the base and spaced apart wherein the legs are configured for positioning on opposite sides of a foot of a toilet. A jack is coupled to the base on an upper surface of the base. Each of a pair of arms is coupled to and extends from the jack. Thus, the operation of the jack selectively lifts the arms away from the base and the legs.

13 Claims, 6 Drawing Sheets

TOILET LIFTING DEVICE

BACKGROUND OF THE DISCLOSURE

Field of the Disclosure

The disclosure relates to lifting devices and more particularly pertains to a new lifting device for facilitating lifting of a toilet when replacing a toilet fixture.

SUMMARY OF THE DISCLOSURE

An embodiment of the disclosure meets the needs presented above by generally comprising a base and a pair of legs extending from the base. The legs are coplanar with the base and spaced apart wherein the legs are configured for positioning on opposite sides of a foot of a toilet. A jack is coupled to the base on an upper surface of the base. Each of a pair of arms is coupled to and extends from the jack. Thus, the operation of the jack selectively lifts the arms away from the base and the legs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
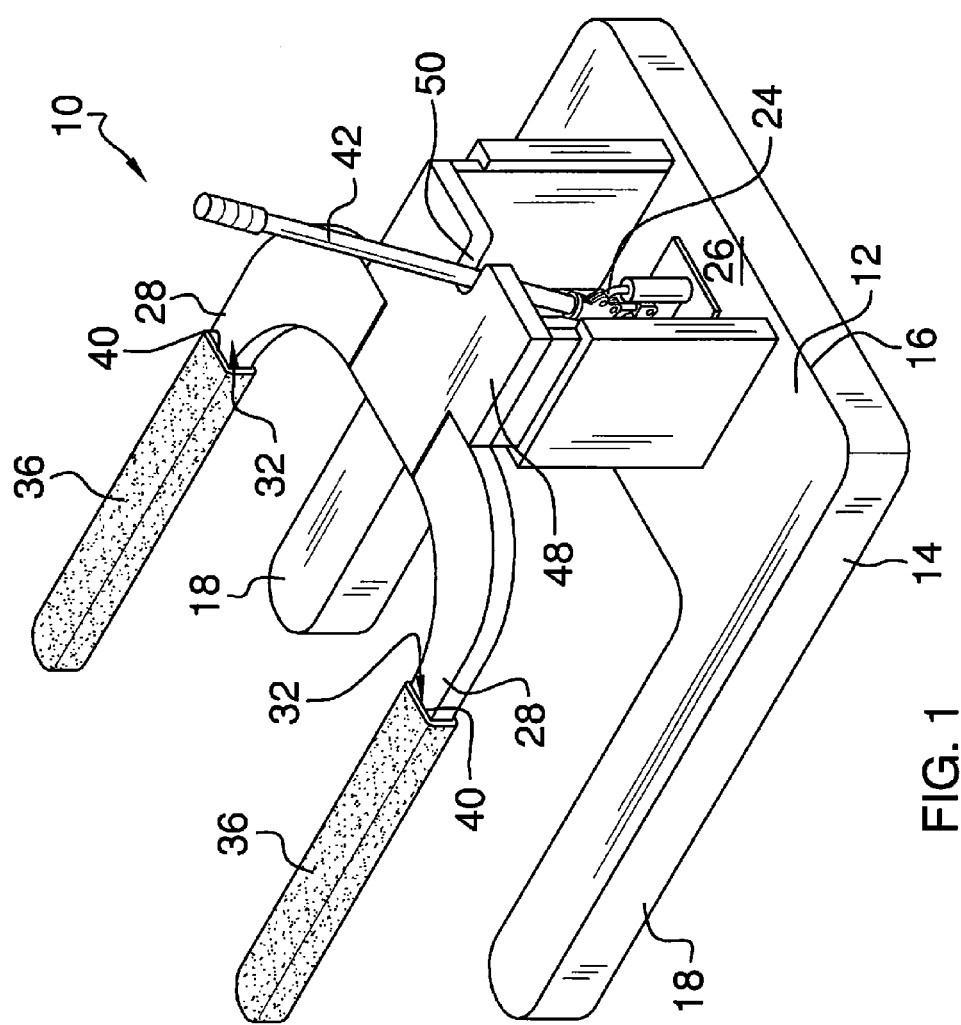
FIG. 1 is a back top side perspective view of a toilet lifting device according to an embodiment of the disclosure.
Figure 2:
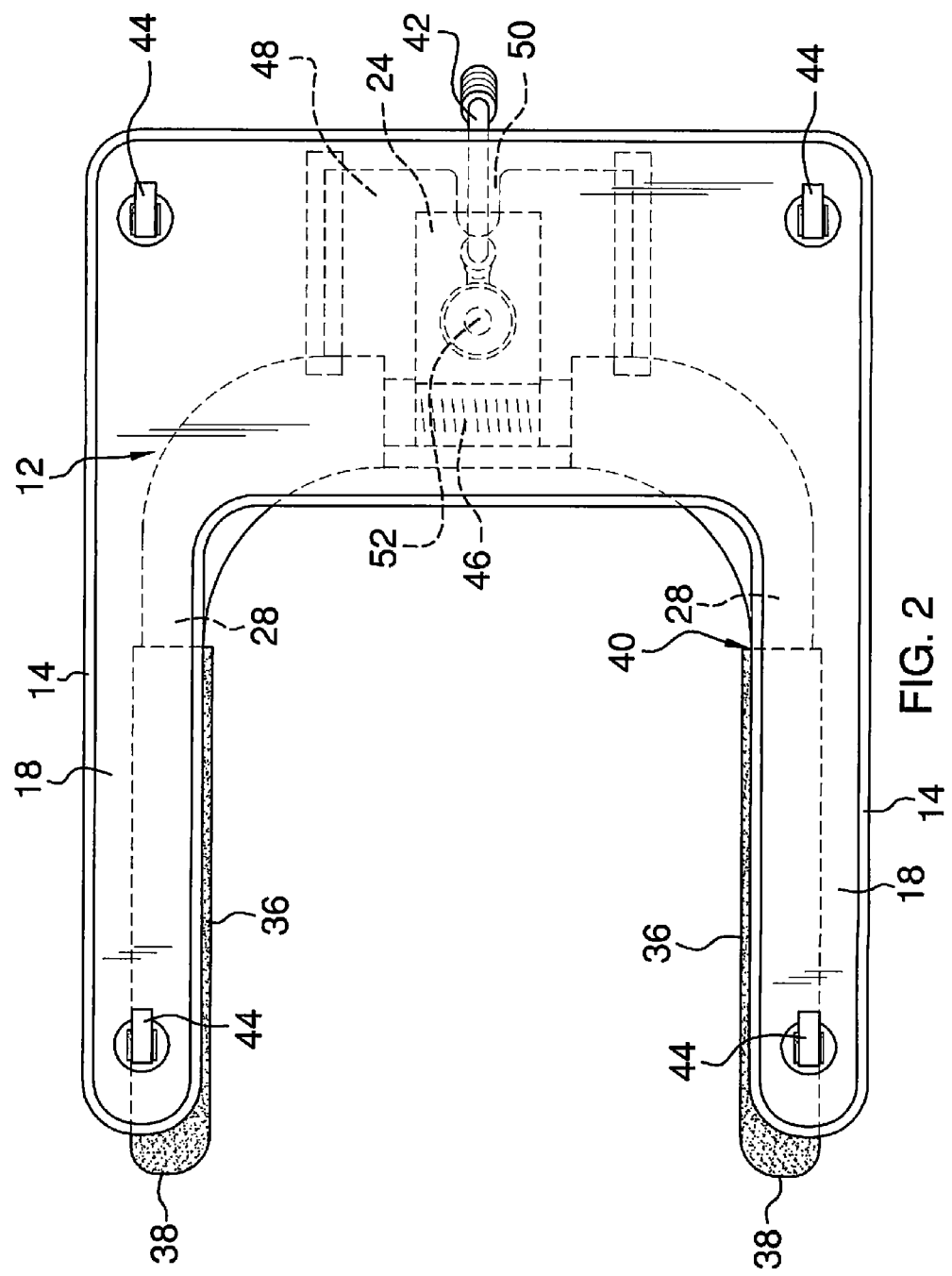
FIG. 2 is a bottom view of an embodiment of the disclosure.
Figure 3:
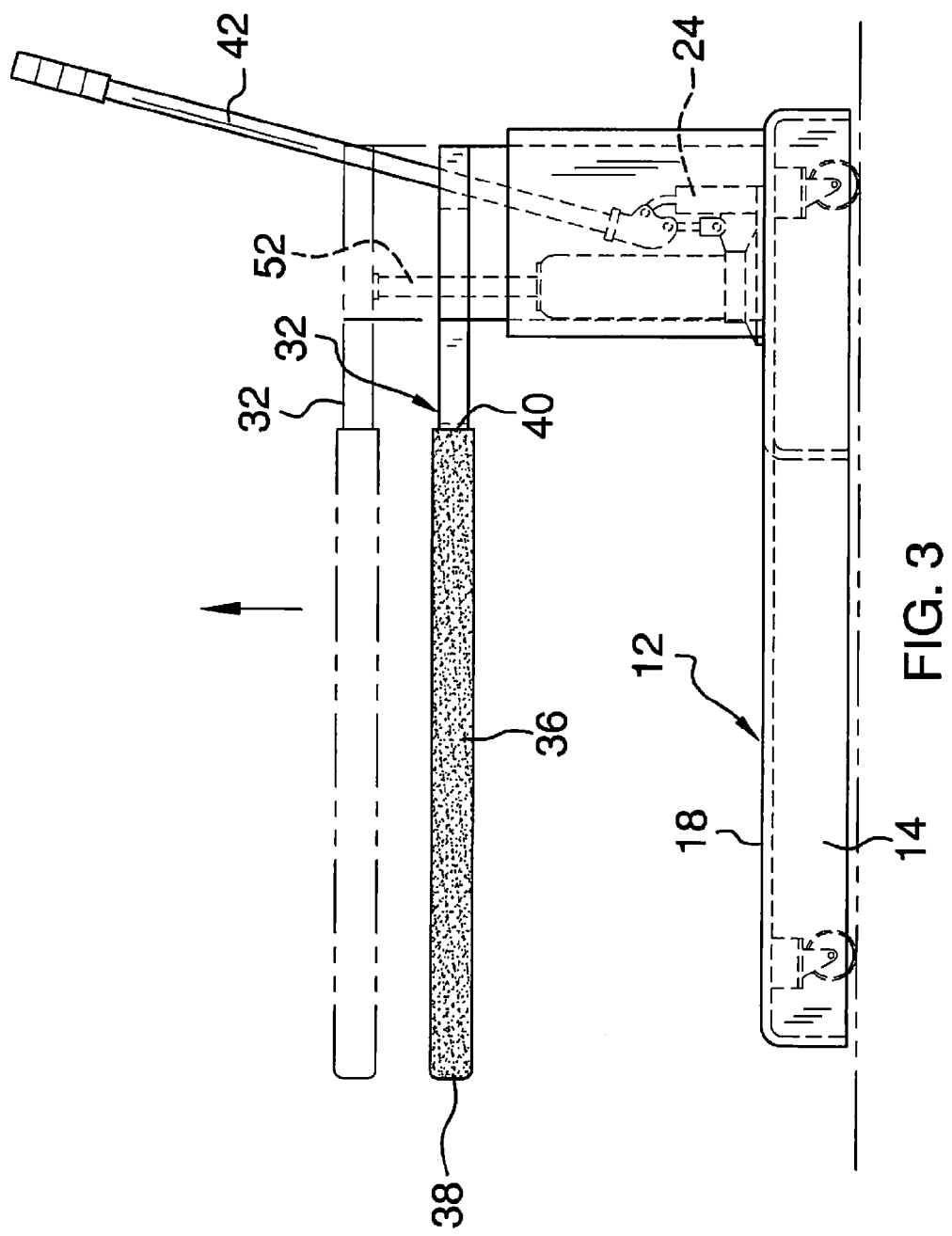
FIG. 3 is a side view of an embodiment of the disclosure.
Figure 4:
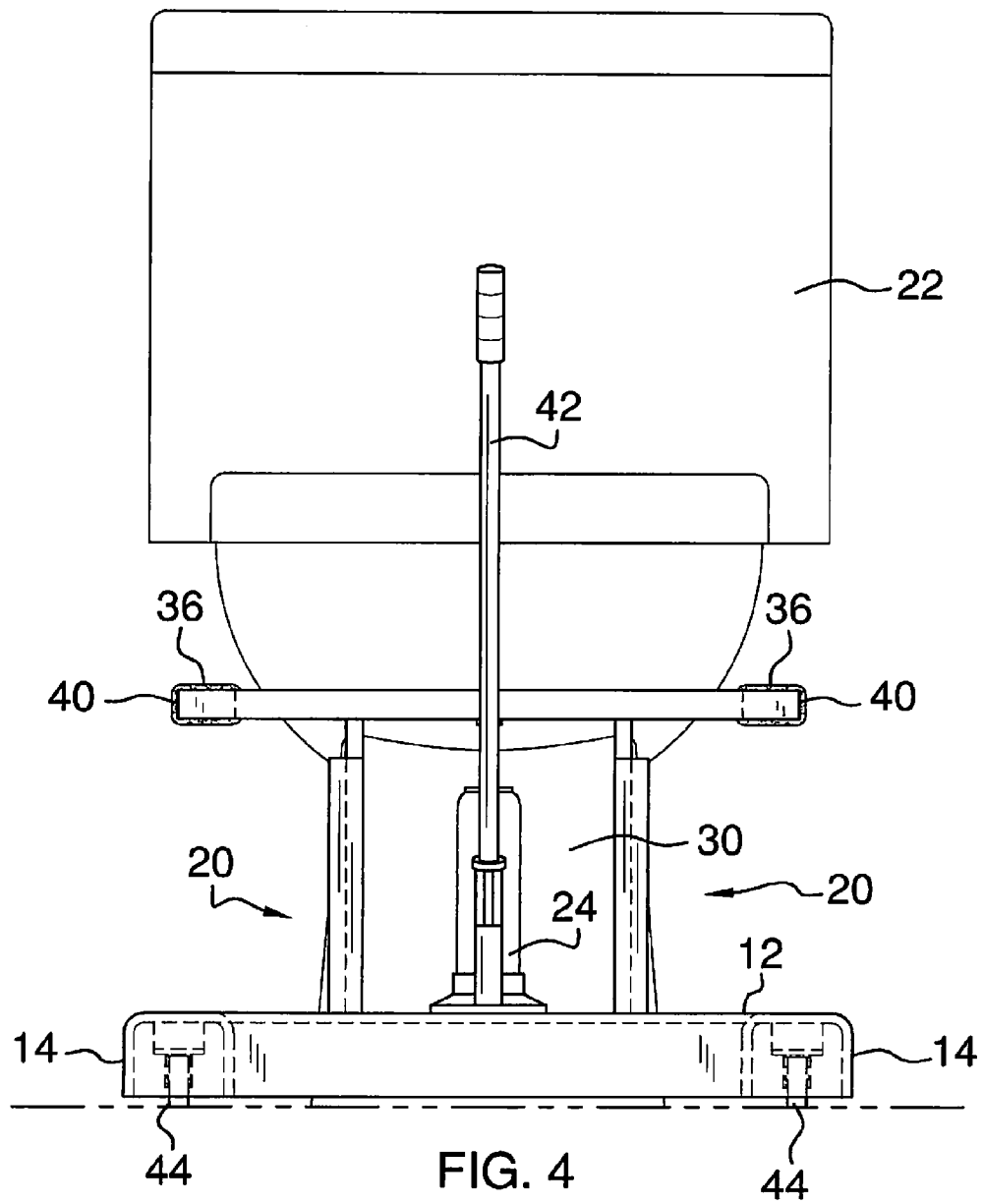
FIG. 4 is a back view of an embodiment of the disclosure.
Figure 5:
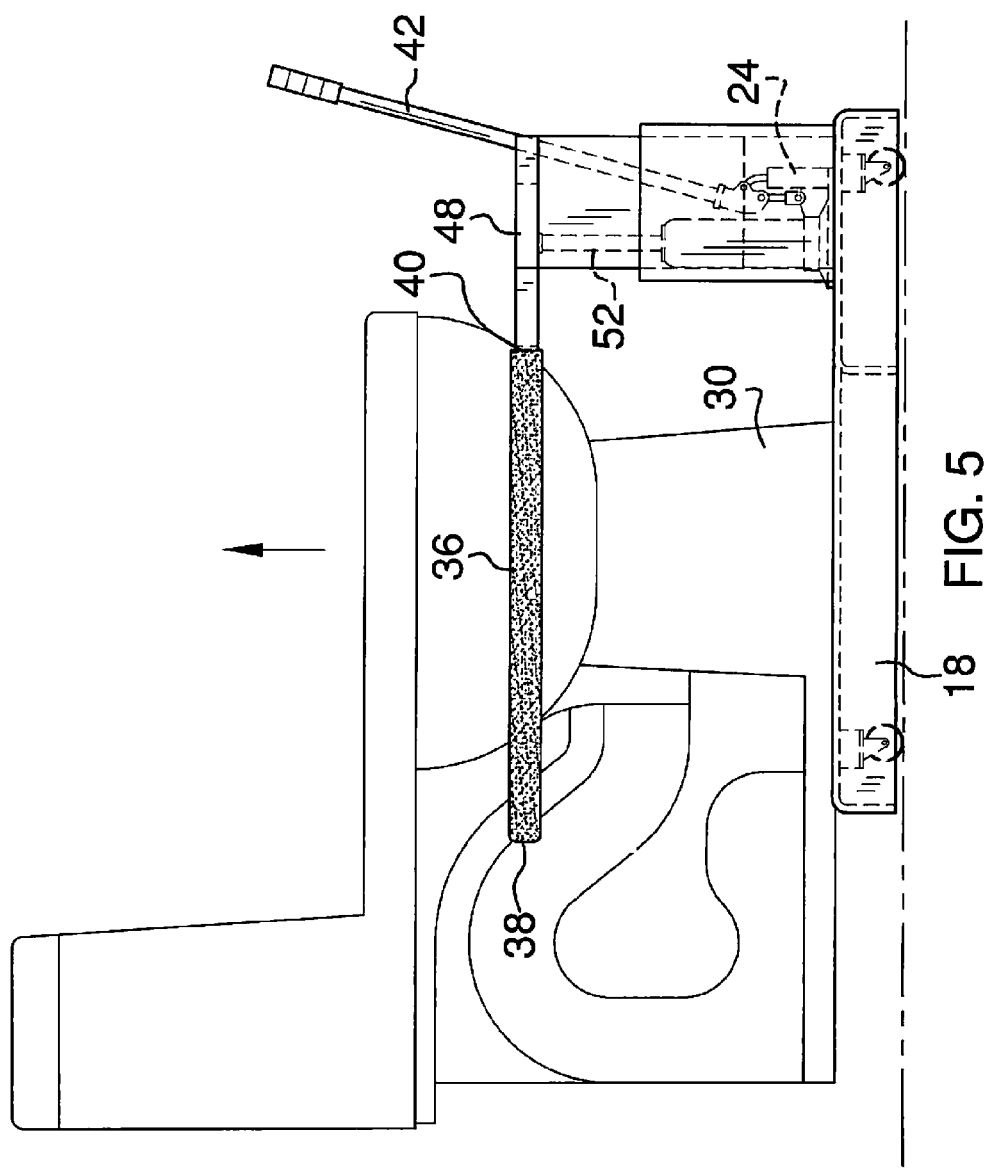
FIG. 5 is a side view of an embodiment of the disclosure in use.
Figure 6:
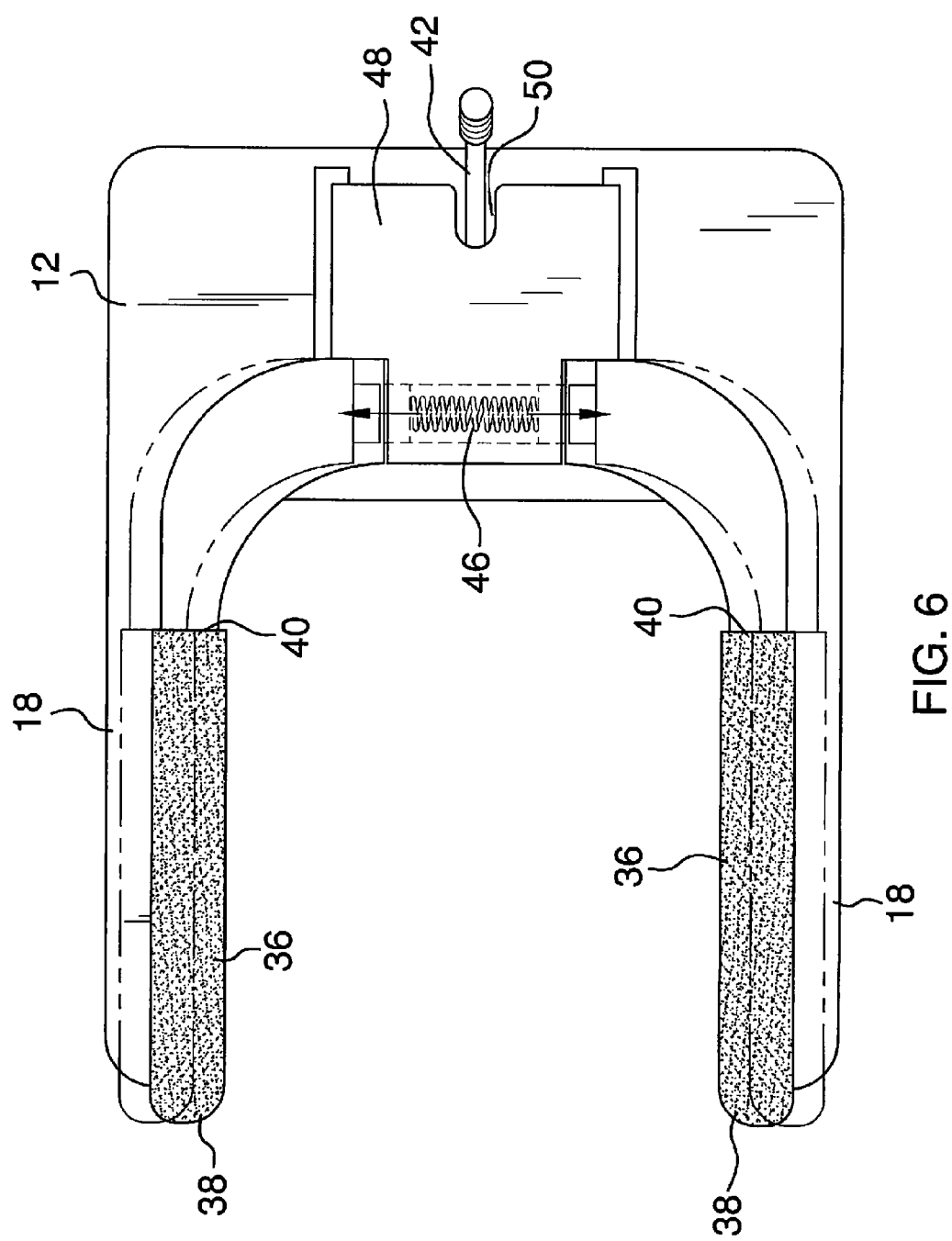
FIG. 6 is a top view of an embodiment of the disclosure.

With reference now to the drawings, and in particular to FIGS. 1 through 6 thereof, a new lifting device embodying the principles and concepts of an embodiment of the disclosure and generally designated by the reference numeral 10 will be described.

As best illustrated in FIGS. 1 through 6, the toilet lifting device 10 generally comprises a base 12 and a perimeter wall 14 coupled to and extending downwardly from a perimeter edge 16 of the base 12. Each of a pair of legs 18 extends from the base 12. The legs 18 are coplanar with the base 12. The legs 18 are spaced apart wherein the legs 18 are configured for positioning on opposite sides 20 of a foot 30 of a toilet 22. The perimeter wall 14 extends downwardly and around each of the legs 18. A jack 24 is coupled to the base 12. The jack 24 is positioned on an upper surface 26 of the base 12. The jack 24 is hydraulic.

Each of a pair of arms 28 is coupled to and extends from the jack 24 wherein operation of the jack 24 selectively lifts the arms 28 away from the base 12 and the legs 18. The arms 28 are spaced to engage the toilet overhanging the opposite sides 20 of the foot 30 of the toilet 22. The arms 28 extend over the legs 18. The arms 28 are parallel to the base 12 and the legs 18. Each of the arms 28 has a planar top face 32 and a rounded distal end 34 relative to the jack 24. Each of a pair of covers 36 is padded to prevent damage to the toilet 22 when it is lifted by the arms 28. Each cover 36 has a closed end 38 and an open end 40. Each of the arms 28 extends into the open end 40 of an associated one of the covers 36 wherein the associated cover 28 is coupled to the associated arm 28.

A jack handle 42 is coupled to and extends from the jack 24. Manipulation of the jack handle 42 operates the jack 24 in conventional fashion wherein the arms 28 are lifted relative to the base 12 to lift the toilet 22. The jack handle 42 is positioned equidistant from each arm 28 and extends upwardly and outwardly away from the base 12 wherein the jack handle 42 extends upwardly and away from the arms 28. This allows the jack handle 42 to be used to move the base 12. Each of a plurality of wheels 44 is coupled to and extends downwardly from the base 12 wherein the base 12 rests upon the wheels 44. Each wheel 44 may be a swivel caster to facilitate moving the device 10 while it supports the toilet 22 in a raised position facilitating removal of the toilet 22 from a small space such as a bathroom.

A panel 48 is coupled to the base 12 over the jack 24. The panel 48 is selectively lifted relative to the base 12 by a shaft 52 extendable from the jack 24. A biasing member 46 is coupled to the panel 48. Each of the arms 28 is slidably coupled to the panel 48 and coupled to the biasing member 46 such that the biasing member urges the arms 28 inwardly towards each other to allow expansion of the arms 28 while maintaining contact with the toilet 22. A slot 50 may be provided in the panel 48 to receive the jack handle 42 as the jack handle 42 is manipulated. The panel 48 and base 12 cover the jack 24 to prevent contact between the jack 24 and the toilet 22 during use.

In use, the device 10 is positioned adjacent to the toilet 22 after connection hardware has been removed from the toilet 22. The jack handle 42 is manipulated to raise the arms 28 engaging and lifting the toilet 22. The jack handle 42 may then be used to steer the lifted toilet 22 to a desired position for disposal or repair. The device may also be used to lift a new toilet and position it for installation. Manipulation of the jack handle 42 lowers the new toilet into position where connection hardware may then be used to hold the new toilet in place.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A toilet lifting device comprising:
   a base;
   a pair of legs extending from said base, said legs being coplanar with said base, said legs being spaced apart wherein said legs are configured for positioning on opposite sides of a toilet;
   a jack coupled to said base, said jack being positioned on an upper surface of said base;
   a pair of arms coupled to and extending from said jack parallel to said base and said legs wherein operation of said jack selectively lifts said arms away from said base and said legs such that said arms remain parallel to said base and said legs when moved by said jack.

2. The device of claim 1, further comprising a perimeter wall coupled to and extending downwardly from a perimeter edge of said base.

3. The device of claim 1, further comprising each of said arms having a planar top face.

4. The device of claim 1, further comprising a pair of covers, each cover having a closed end and an open end, each of said arms extending into said open end of an associated one of said covers wherein said associated cover is coupled to said associated arm.

5. The device of claim 1, further comprising each said arm having a rounded distal end relative to said jack.

6. The device of claim 1, further comprising said arms extending over said legs.

7. The device of claim 1, further comprising said jack being hydraulic.

8. The device of claim 1, further comprising a jack handle coupled to and extending from said jack, manipulation of said jack handle operating said jack wherein said arms are lifted relative to said base.

9. The device of claim 8, further comprising said jack handle being positioned equidistant from each said arm.

10. The device of claim 8, further comprising said jack handle extending upwardly and outwardly away from said base wherein said jack handle extends upwardly and away from said arms.

11. The device of claim 1, further comprising a plurality of wheels coupled to and extending downwardly from said base wherein said base rests upon said wheels.

12. The device of claim 1, further comprising each said wheel being a swivel caster.

13. A toilet lifting device comprising:
   a base, a perimeter wall coupled to and extending downwardly from a perimeter edge of said base;
   a pair of legs extending from said base, said legs being coplanar with said base, said legs being spaced apart wherein said legs are configured for positioning on opposite sides of a toilet, said perimeter wall extending downwardly and around each of said legs;
   a jack coupled to said base, said jack being positioned on an upper surface of said base, said jack being hydraulic;
   a pair of arms coupled to and extending from said jack parallel to said base and said legs wherein operation of said jack selectively lifts said arms away from said base and said legs such that said arms remain parallel to said base and said legs when moved by said jack, said arms extending over said legs, each of said arms having a planar top face, each said arm having a rounded distal end relative to said jack;
   a pair of covers, each of said covers being padded, each cover having a closed end and an open end, each of said arms extending into said open end of an associated one of said covers wherein said associated cover is coupled to said associated arm;
   a jack handle coupled to and extending from said jack, manipulation of said jack handle operating said jack wherein said arms are lifted relative to said base, said jack handle being positioned equidistant from each said arm, said jack handle extending upwardly and outwardly away from said base wherein said jack handle extends upwardly and away from said arms; and
   a plurality of wheels coupled to and extending downwardly from said base wherein said base rests upon said wheels, each said wheel being a swivel caster.

* * * * *